United States Patent
Wang et al.

(10) Patent No.: US 11,510,238 B2
(45) Date of Patent: Nov. 22, 2022

(54) RANDOM ACCESS FOR A NON-TERRESTRIAL NETWORK

(71) Applicant: QUALCOMM Incorporated, San Diego, CA (US)

(72) Inventors: Xiao Feng Wang, San Diego, CA (US); Iyab Issam Sakhnini, San Diego, CA (US); Jun Ma, San Diego, CA (US); Huilin Xu, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 16/831,274

(22) Filed: Mar. 26, 2020

(65) Prior Publication Data
US 2020/0314892 A1 Oct. 1, 2020

Related U.S. Application Data

(60) Provisional application No. 62/826,456, filed on Mar. 29, 2019.

(51) Int. Cl.
H04W 74/00 (2009.01)
H04W 74/08 (2009.01)
H04B 7/185 (2006.01)

(52) U.S. Cl.
CPC ..... *H04W 74/006* (2013.01); *H04W 74/0833* (2013.01)

(58) Field of Classification Search
CPC ... H04W 74/006; H04W 74/08; H04B 7/1851
See application file for complete search history.

(56) References Cited

U.S. PATENT DOCUMENTS

| 9,538,554 | B2 | 1/2017 | Kim et al. |
| 2015/0146631 | A1* | 5/2015 | Kim ...... H04L 5/0053 370/329 |

(Continued)

FOREIGN PATENT DOCUMENTS

| KR | 2021110874 A | * | 9/2021 | ........... H04B 7/1851 |
| WO | 2018204629 A1 | | 11/2018 | |
| WO | WO-2019216706 A1 | * | 11/2019 | ............. H04B 7/185 |

OTHER PUBLICATIONS

"Satellite Earth Stations and Systems (SES); Satellite Component of UMTS/IMT2000; Detailed Analysis of the Packet Mode for the SW-CDMA (Family A); ETSI TR 102061", Technical Report. European Telecommunications Standards Institute (ETSI). 650 Route Des, Lucioles, Sophia Antipolis Cedex. F-06921. France, vol. SES-S-UMTS. No. V1.1.1, May 1, 2004 (May 1, 2004), 205 pages, XP014015522, p. 157. paragraph F.2.5.2, p. 159. paragraph F.2.6.1, p. 163. paragraph F.2 6.3—p. 166, paragraph F.2 6.4.

(Continued)

*Primary Examiner* — Ayanah S George
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive information that indicates whether to perform a first random access channel (RACH) procedure for a non-terrestrial network or a second RACH procedure for a terrestrial network, wherein the first RACH procedure is configured to support a larger number of UEs contemporaneously performing a RACH procedure than the second RACH procedure. Responsive to the information indicating that the UE is to perform the first RACH procedure, the UE may perform the first RACH procedure. Numerous other aspects are provided.

30 Claims, 6 Drawing Sheets

(56) References Cited

U.S. PATENT DOCUMENTS

2016/0269980 A1* 9/2016 Simon .................. H04L 27/2663
2018/0054333 A1* 2/2018 Rinne ............... H04L 25/03866

OTHER PUBLICATIONS

International Search Report and Written Opinion—PCT/US2020/025406—ISA/EPO—dated Jun. 22, 2020.
Nokia, et al., "Overview for NR Supporting NTN", 3GPP Draft, 3GPP TSG RAN WG1 Meeting #96, R1-1901722, 3rd Generation Partnership Project (3GPP), Mobile Competence Centre, 650, Route Des Lucioles, F-06921, Sophia-Antipolis Cedex, France, vol. RAN WG1. No.Athens. Greece; Feb. 25, 2019-Mar. 1, 2019, Feb. 16, 2019 (Feb. 16, 2019), XP051599418, 10 pages, Retrieved from the Internet: URL: http://www.3gpp.org/ftp/tsg%5Fran/WG1%5FRL1/TSGR1%5F96/Docs/R1%2D1901722%2Ezip [retrieved on Feb. 16, 2019], the whole document.
International Search Report and Written Opinion—PCT/US2020/025406—ISA/EPO—dated Jul. 26, 2021.

* cited by examiner

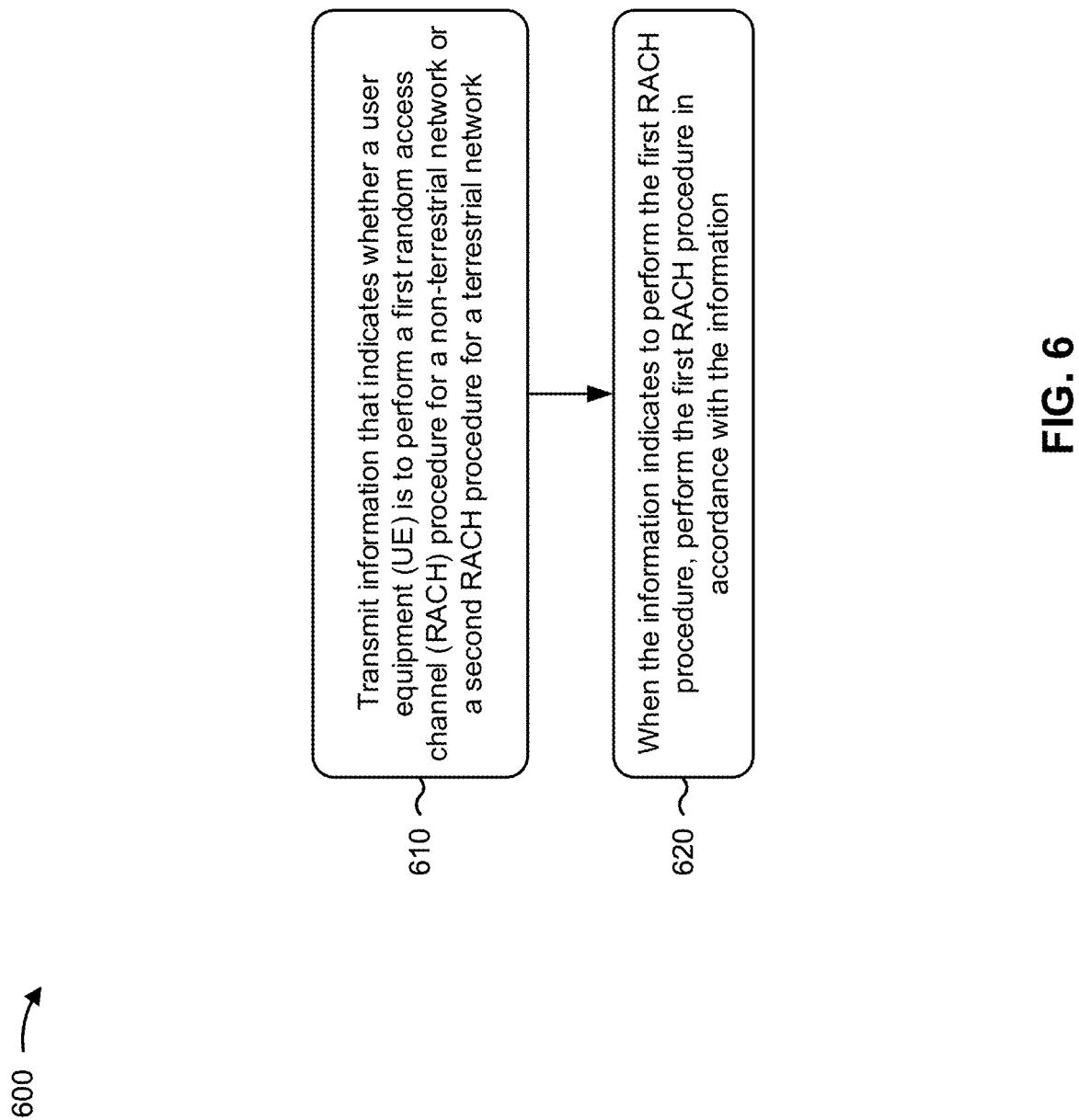

RANDOM ACCESS FOR A NON-TERRESTRIAL NETWORK

CROSS-REFERENCE TO RELATED APPLICATION

This Patent Application claims priority to Provisional Patent Application No. 62/826,456, filed on Mar. 29, 2019, entitled "RANDOM ACCESS FOR A NON-TERRESTRIAL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication, and to random access for a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include receiving or determining information that indicates whether to perform a first random access channel (RACH) procedure for a non-terrestrial network or a second RACH procedure for a terrestrial network, wherein the first RACH procedure is configured to support a larger number of UEs contemporaneously performing a RACH procedure than the second RACH procedure, and wherein the information is based at least in part on whether the UE is associated with the non-terrestrial network or the terrestrial network; and selectively performing the first RACH procedure or the second RACH procedure in accordance with the information.

In some aspects, a UE for wireless communication may include memory and one or more processors operatively coupled to the memory. The memory and the one or more processors may be configured to receive or determine information that indicates whether to perform a first RACH procedure for a non-terrestrial network or a second RACH procedure for a terrestrial network, wherein the first RACH procedure is configured to support a larger number of UEs contemporaneously performing a RACH procedure than the second RACH procedure, and wherein the information is based at least in part on whether the UE is associated with the non-terrestrial network or the terrestrial network; and selectively perform the first RACH procedure or the second RACH procedure in accordance with the information.

In some aspects, a method of wireless communication, performed by a network device (such as a base station in a non-terrestrial network, a core network device, and/or the like), may include transmitting information that indicates that a UE is to perform a first RACH procedure for a non-terrestrial network, wherein the first RACH procedure is configured to support a larger number of UEs contemporaneously performing a RACH procedure than a second RACH procedure for a terrestrial network; and performing the first RACH procedure in accordance with the information.

In some aspects, a network device (such as a base station in a non-terrestrial network, a core network device, and/or the like) may include memory and one or more processors operatively coupled to the memory. The memory and the one or more processors may be configured to transmit information that indicates that a UE is to perform a first RACH procedure for a non-terrestrial network, wherein the first RACH procedure is configured to support a larger number of UEs contemporaneously performing a RACH procedure than a second RACH procedure for a terrestrial network; and perform the first RACH procedure in accordance with the information.

In some aspects, a non-transitory computer-readable medium may store one or more instructions for wireless communication. The one or more instructions, when executed by one or more processors of a UE, may cause the one or more processors to: receive or determine information that indicates whether to perform a first RACH procedure for a non-terrestrial network or a second RACH procedure for a terrestrial network, wherein the first RACH procedure is configured to support a larger number of UEs contemporaneously performing a RACH procedure than the second RACH procedure, and wherein the information is based at least in part on whether the UE is associated with the non-terrestrial network or the terrestrial network; and selectively perform the first RACH procedure or the second RACH procedure in accordance with the information.

In some aspects, a non-transitory computer-readable medium may store one or more instructions for wireless communication. The one or more instructions, when executed by one or more processors of a network device, may cause the one or more processors to: transmit information that indicates that a UE is to perform a first RACH procedure for a non-terrestrial network, wherein the first RACH procedure is configured to support a larger number of UEs contemporaneously performing a RACH procedure than a second RACH procedure for a terrestrial network; and perform the first RACH procedure in accordance with the information.

In some aspects, an apparatus for wireless communication may include means for receiving or determining information that indicates whether to perform a first RACH procedure for a non-terrestrial network or a second RACH procedure for a terrestrial network, wherein the first RACH procedure is configured to support a larger number of UEs contemporaneously performing a RACH procedure than the second RACH procedure, and wherein the information is based at least in part on whether the apparatus is associated with the non-terrestrial network or the terrestrial network; and means for selectively performing the first RACH procedure or the second RACH procedure in accordance with the information.

In some aspects, an apparatus for wireless communication may include means for transmitting information that indicates that a UE is to perform a first RACH procedure for a non-terrestrial network, wherein the first RACH procedure is configured to support a larger number of UEs contemporaneously performing a RACH procedure than a second RACH procedure for a terrestrial network, and means for performing the first RACH procedure in accordance with the information.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a network device, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies. Furthermore, while aspects may be described herein as being used for non-terrestrial networks, aspects of the present disclosure can be applied for other forms of networks. Indeed, aspects of the present disclosure may be of particular benefit in networks associated with a large number of UEs in the coverage area of a cell.

Figure 1:
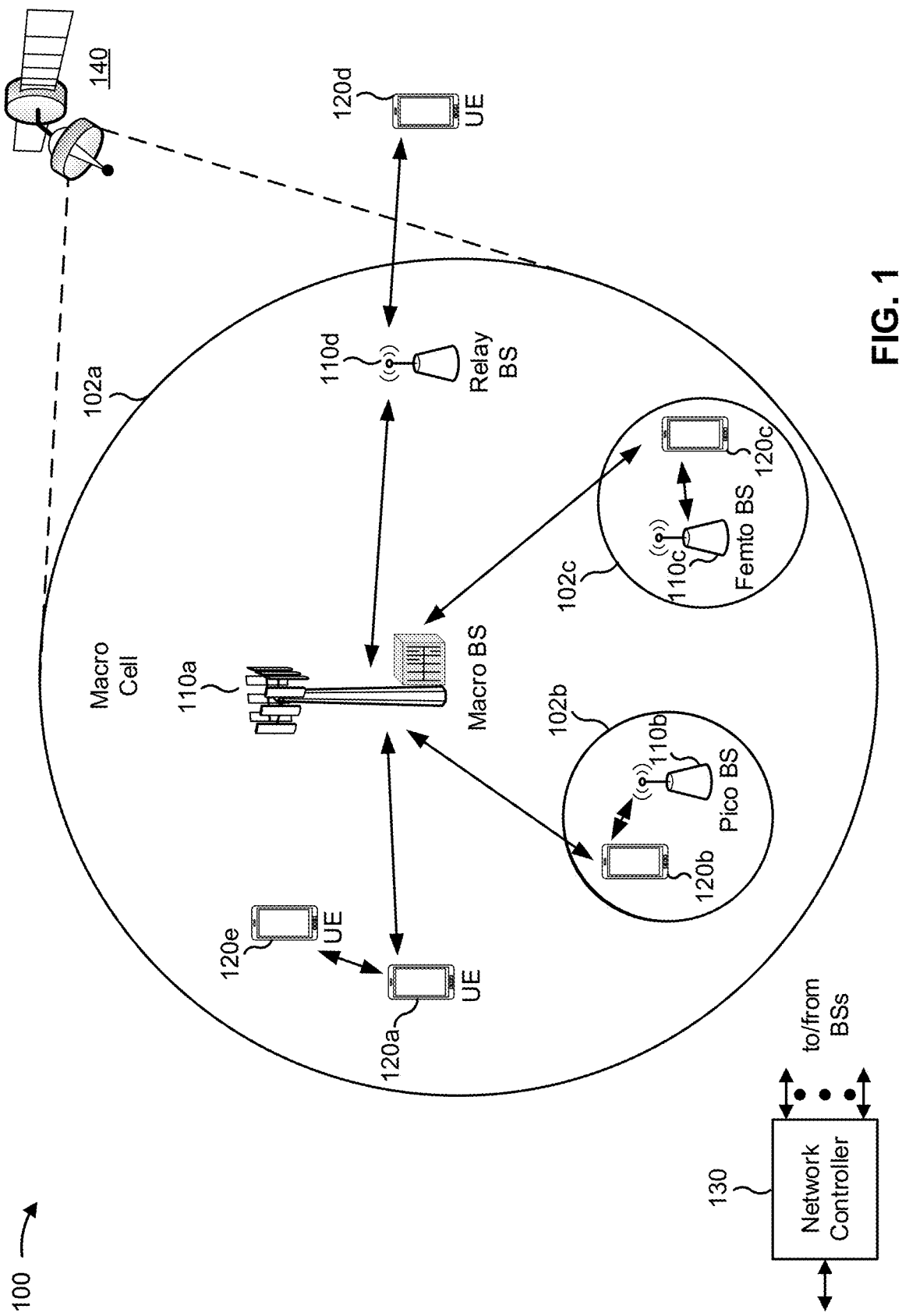
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

In some aspects, as shown, a cell may be provided by a base station 140 of a non-terrestrial network. As used herein, a non-terrestrial network may refer to a network for which access is provided by a non-terrestrial base station, such as a base station carried by a satellite, a balloon, a dirigible, an airplane, an unmanned aerial vehicle, a high altitude platform station, and/or the like. Base station 140 may be part of a non-terrestrial network that is separate from wireless network 100. Alternatively, the non-terrestrial network (of which base station 140 is a part) may be part of the wireless network 100.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like. In one example, base station 140 can be an example of relay station 110d.

Wireless network 100 may be a heterogeneous network that includes BSs of different types, e.g., macro BSs, pico BSs, femto BSs, relay BSs, non-terrestrial BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

One or more of the operations described herein may be performed by a network device. A network device may include base station 110, a core network device of a 4G or 5G network, a device of a non-terrestrial network, and/or the like.

As indicated above, FIG. 1 is provided as an example. Other examples may differ from what is described with regard to FIG. 1.

Figure 2:
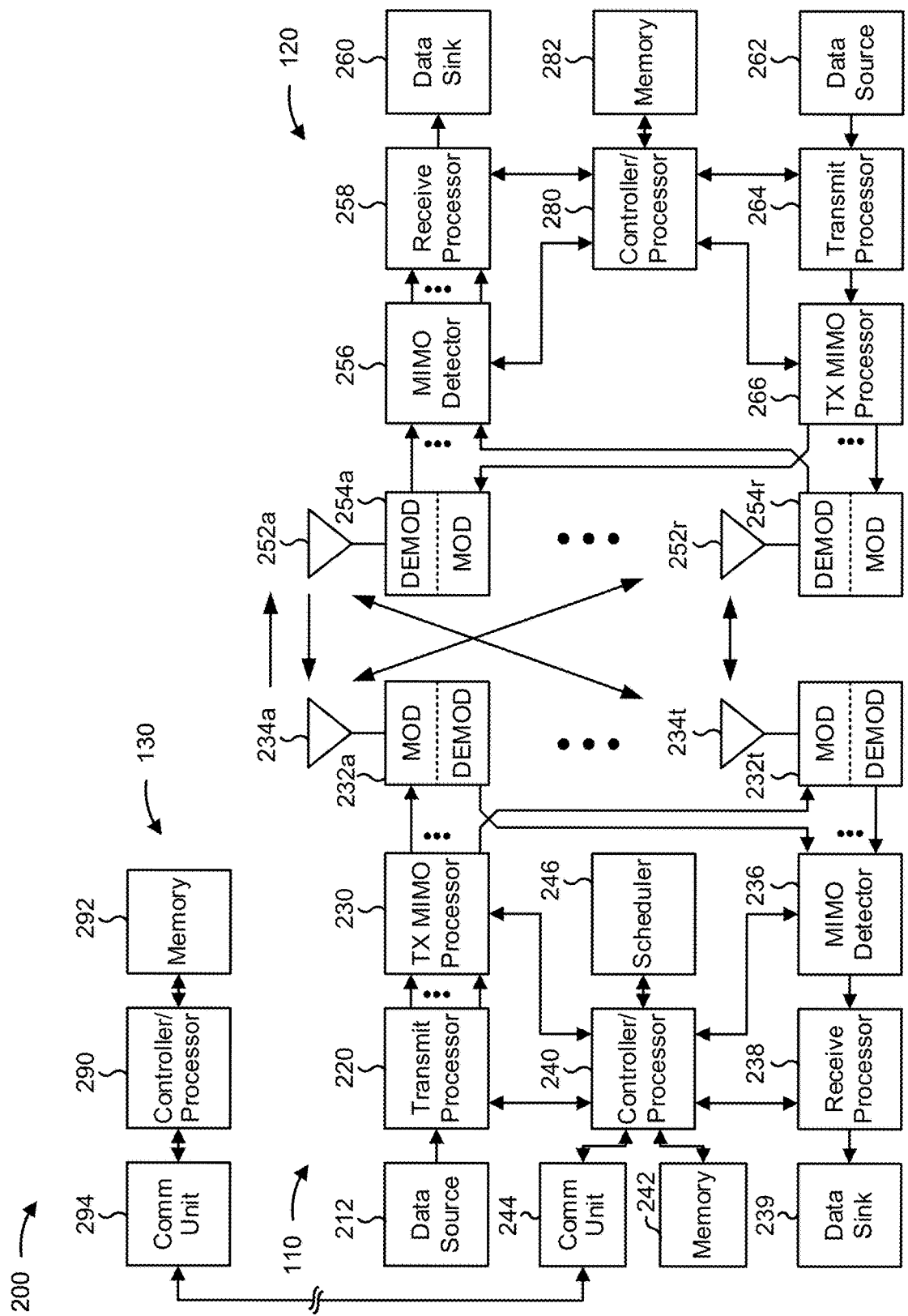
FIG. 2 is a block diagram conceptually illustrating an example of a base station in communication with a UE in a wireless communication network, in accordance with various aspects of the present disclosure.

FIG. 2 shows a block diagram of a design 200 of a base station (e.g., base station 110 or base station 140) and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with random access for a non-terrestrial network, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., receive processor 258 and/or controller/processor 280) of the UE 120, cause the one or more processors to perform the method described in greater detail with reference to FIGS. 3-4. A scheduler 246 may schedule UEs for data transmission on the downlink and/or uplink.

In some aspects, UE 120 may include means for receiving (e.g., using antenna 252, DEMOD 254, MIMO detector 256, receive processor 258, controller/processor 280, and/or the like) or determining (e.g., using controller/processor 280 and/or the like) information that indicates whether to perform a first random access channel (RACH) procedure for a non-terrestrial network or a second RACH procedure for a terrestrial network, wherein the first RACH procedure is configured to support a larger number of UEs contemporaneously performing a RACH procedure than the second RACH procedure, and wherein the information is based at least in part on whether the UE is associated with the non-terrestrial network or the terrestrial network; means for selectively performing (e.g., using controller/processor 280, transmit processor 264, TX MIMO processor 266, MOD 254, antenna 252, and/or the like) the first RACH procedure or the second RACH procedure in accordance with the information; means for performing (e.g., using controller/processor 280, transmit processor 264, TX MIMO processor 266, MOD 254, antenna 252, and/or the like) the first RACH procedure, wherein the first RACH procedure includes a first coding procedure comprising a Zadoff-Chu coding procedure and a second coding procedure; means for receiving (e.g., using antenna 252, DEMOD 254, MIMO detector 256, receive processor 258, controller/processor 280, and/or the like) an indication to perform the second coding procedure, wherein the first RACH procedure includes the second coding procedure based at least in part on the indication; means for determining (e.g., using antenna 252, DEMOD 254, MIMO detector 256, receive processor 258, controller/processor 280, and/or the like) whether to perform the first RACH procedure for the non-terrestrial network or the second RACH procedure for the terrestrial network based at least in part on the information; and/or the like. In some aspects, such means may include one or more components of UE 120 described in connection with FIG. 2.

In some aspects, base station 110 may include means for transmitting (e.g., using controller/processor 240, transmit processor 220, TX MIMO processor 230, MOD 232, antenna 234, and/or the like) information that indicates that a user equipment (UE) is to perform a first random access channel (RACH) procedure for a non-terrestrial network, wherein the RACH procedure is configured to support a larger number of UEs contemporaneously performing a RACH procedure than a second RACH procedure for a terrestrial network; means for performing (e.g., using controller/processor 240, transmit processor 220, TX MIMO processor 230, MOD 232, antenna 234, and/or the like) the first RACH procedure in accordance with the information; means for signaling a signature to be used for the second coding procedure to the UE; means for signaling (e.g., using controller/processor 240, transmit processor 220, TX MIMO processor 230, MOD 232, antenna 234, and/or the like) information identifying a cover code to be used for the cover coding procedure to the UE; means for providing (e.g., using controller/processor 240, transmit processor 220, TX MIMO processor 230, MOD 232, antenna 234, and/or the like) an indication that the UE is to perform the second coding procedure as part of the first RACH procedure; means for receiving (e.g., using antenna 234, DEMOD 232, MIMO detector 236, receive processor 238, controller/processor 240, and/or the like) a RACH message based at least in part on a particular code, wherein the particular code is based at least in part on a beam, of the multiple beams, for which the first RACH procedure is being performed; means for determining (e.g., using controller/processor 240, transmit processor 220, TX MIMO processor 230, MOD 232, antenna 234, and/or the like) whether to perform the first RACH procedure for the non-terrestrial network or the second RACH procedure for the terrestrial network based at least in part on the information; and/or the like. In some aspects, such means may include one or more components of base station 110 described in connection with FIG. 2.

As indicated above, FIG. 2 is provided as an example. Other examples may differ from what is described with regard to FIG. 2.

A non-terrestrial base station (referred to hereafter as a BS or a base station) may provide access to a non-terrestrial network for UEs or ground stations. As used herein, a ground station may refer to a radio station designed for communication with a non-terrestrial BS via a non-terrestrial network. A reference to a UE herein can also refer to a ground station. Furthermore, a reference to a BS can also refer to a relay station.

The BS may transmit using multiple antennas that each cover a surface area. The footprint of a beam transmitted by an antenna can be defined as a cell. A UE may acquire the BS based at least in part on searching for a synchronization signal using a spatial technique (e.g., by pointing a receive antenna beam towards the satellite), a frequency technique (e.g., by scanning different frequencies until the BS's signal is acquired), a timing technique (e.g., by searching for a starting time of a signal), a sequence-based technique (e.g., by identifying a code sequence of a synchronization signal), and/or the like. Examples of a synchronization signal include a synchronization signal block (SSB), a primary synchronization signal (PSS), a secondary synchronization signal (SSS), a physical broadcast channel (PBCH), and/or the like.

Once the UE detects a beam, the UE and the BS may perform a random access channel (RACH) procedure, such as a physical RACH (PRACH) procedure, to access the network. In the RACH procedure, the UE may transmit a RACH preamble on a particular set of resources, referred to interchangeably herein as a RACH resource or a RACH occasion. The BS may detect the RACH preamble and may transmit a response to the UE.

In a non-terrestrial network, PRACH preamble resources may be larger than in a terrestrial network, such as an LTE network or a 5G/NR terrestrial network. This may be due to non-terrestrial networks being associated with larger Doppler shifts (and thus a wider subcarrier spacing) and longer delays than a terrestrial network, which may necessitate a larger frequency allocation and a longer time allocation for the RACH preamble. Also, a larger number of UEs may be expected to perform handovers concurrently in a non-terrestrial network, particularly a non-terrestrial network in which the cells are in constant motion (e.g., when the cells are provided by a satellite in low earth orbit or mid earth orbit). Furthermore, the cell may be larger than a terrestrial network cell, which may mean that a larger number of UEs may be expected to perform RACH procedures on the cell.

Some techniques and apparatuses described herein provide multiplexing techniques for RACH preambles so that a number of UEs that can concurrently perform a RACH procedure is increased. For example, some techniques and apparatuses described herein provide a larger number of Zadoff-Chu shifts or roots than in a terrestrial network RACH procedure, an additional coding procedure (e.g., in addition to the Zadoff-Chu coding procedure), multiplexing of multiple RACH preambles in a single time and frequency resource, and/or the like. The UE may perform an NTN RACH procedure (such as those described above) based at least in part on an indication from a BS that the UE is to perform the NTN RACH procedure. Thus, the number of UEs that can concurrently perform a RACH procedure is increased and resource utilization is improved.

Figure 3:
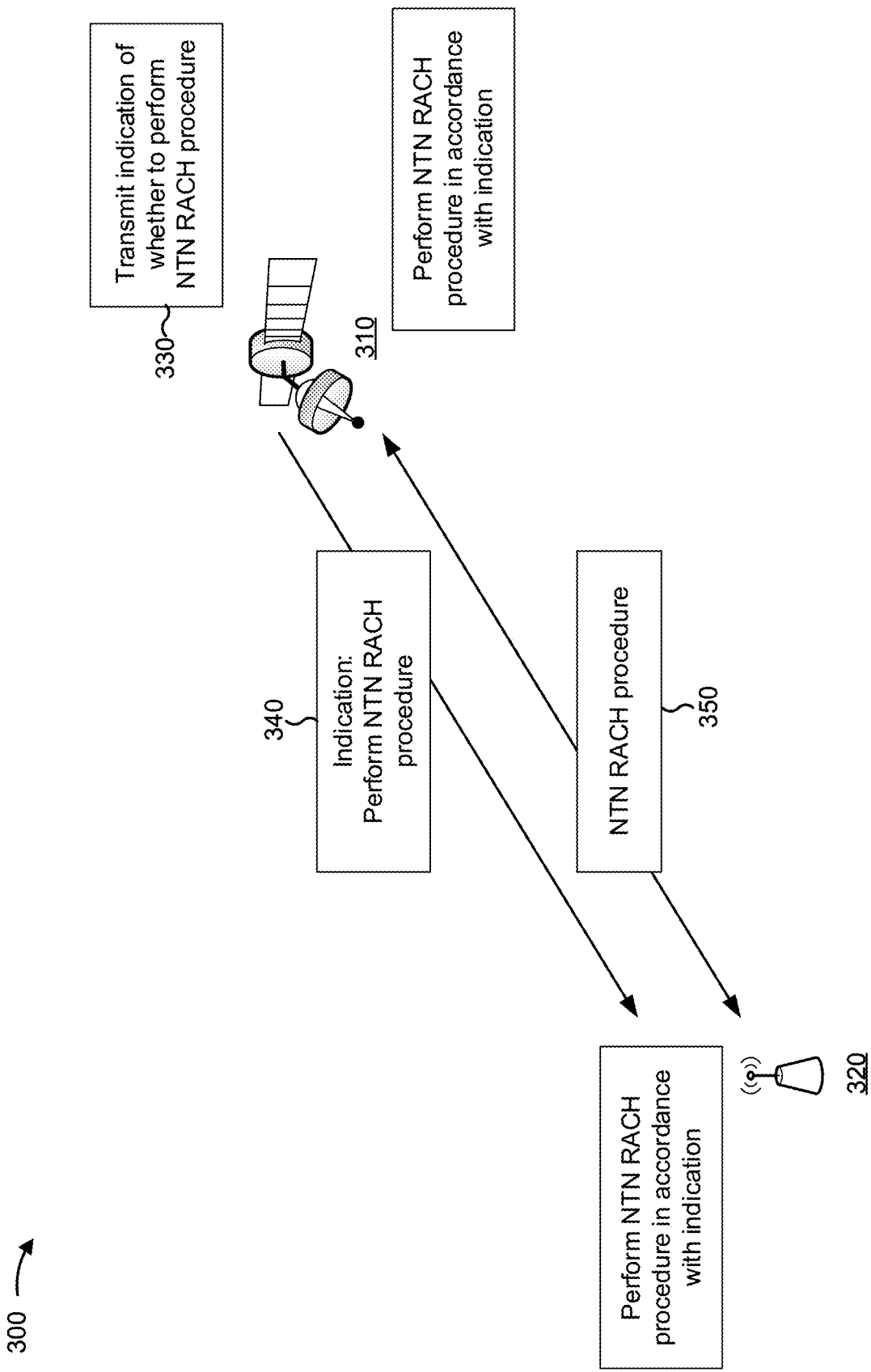
FIG. 3 is a diagram illustrating an example of random access in a non-terrestrial network, in accordance with various aspects of the present disclosure.

FIG. 3 is a diagram illustrating an example 300 of random access in a non-terrestrial network, in accordance with various aspects of the present disclosure. As shown, FIG. 3 includes a base station 310 (e.g., BS 110, a non-terrestrial BS such as BS 140, a relay station, a non-terrestrial network, and/or the like) and a UE 320 (e.g., UE 120, a ground station, a relay station, and/or the like). Base station 310 is referred to hereinafter as a BS, and UE 320 is referred to hereinafter as a UE. In some aspects, base station 310 may be referred to as a network device.

As shown in FIG. 3, and by reference number 330, the BS may transmit an indication of whether the UE is to perform a first RACH procedure (e.g., a RACH procedure associated with a non-terrestrial network (NTN)) or a second RACH procedure (e.g., a RACH procedure not associated with an NTN, such as a RACH procedure associated with a terrestrial network). In some aspects, the indication may be transmitted using radio resource configuration (RRC) messaging, downlink control information (DCI), a media access control (MAC) control element (CE), and/or the like. In some aspects, the indication may be based at least in part on a synchronization signal block (SSB) of the UE. For example, the SSB may be associated with information identifying the indication, or may be configured in a way that provides the indication (e.g., scrambled using a particular radio temporary network identifier, provided in a time or frequency location that indicates the indication, and/or the like).

It should be understood that information for performing the first RACH procedure can be transmitted by the network, and received by the UE, in more than one transmission or message. The information for performing the first RACH procedure can include such information as that described herein, for example, Zadoff-Chu signatures used in the first RACH procedure; information for performing the first coding procedure and the second coding procedure; an indication for performing the second coding procedure; one or more time or frequency resources, one or more beams, one or more codes, one or more sets of codes, one or more subsets of the one or more sets of codes, one or more bandwidth parts, one or more resource blocks, and/or any combination thereof used in performing the first RACH procedure. In some implementations, the information that indicates whether to perform the first RACH procedure may comprise information for performing the first RACH procedure as just described such that network implicitly indicates to the UE to perform the first RACH procedure by transmitting the information for the first RACH procedure (for example, where the network does not transmit the information for the second RACH procedure). In such implementations, the UE can receive the information for performing the first RACH procedure and determine, based on this implicit indication to perform the first RACH procedure, that the UE is to perform the first RACH procedure even without an explicit indication.

As shown by reference number 340, in this case, the indication may indicate that the UE and the BS are to perform an NTN RACH procedure. An NTN RACH procedure may refer to a RACH procedure wherein one or more techniques are used to increase a number of RACH preambles that can be multiplexed as part of the RACH procedure. Particular operations that can be performed as part of the NTN RACH procedure are described in more detail in connection with example 400 of FIG. 4. In some aspects, the indication may indicate which operations are to be performed as part of the NTN RACH procedure, or may indicate parameters for the NTN RACH procedure, as is also described in more detail in connection with FIG. 4. In the case when the indication indicates that the UE and the BS are to perform a terrestrial network RACH procedure, then the UE and the BS may perform a terrestrial network RACH procedure (e.g., a RACH procedure prescribed by 5G/NR, LTE, and/or the like).

As shown by reference number 350, the UE and the BS may perform the NTN RACH procedure. For example, the UE may perform one or more of the operations described in connection with FIG. 4 in order to increase the number of RACH preambles that can be concurrently multiplexed. Thus, the increased number of UEs and the increased rate of handover associated with NTN may be mitigated.

In some cases, a UE and a BS are referred to herein as "performing a RACH procedure." When a UE performs a RACH procedure, the UE may perform the UE-side steps of the RACH procedure (e.g., Messages 1 and 3 in a four-step RACH procedure or Message 1 in a two-step RACH procedure). When a BS performs a RACH procedure, the BS may perform the BS-side steps of the RACH procedure (e.g., Messages 2 and 4 in a four-step RACH procedure or Message 2 in a two-step RACH procedure).

In some aspects, the RACH preambles for multiple, different beams may be configured on the same bandwidth part (e.g., a bandwidth part of one of the multiple different beams or a bandwidth part of a beam other than the multiple, different beams). In this case, the UE may multiplex the RACH preambles of multiple different beams in a same time and/or frequency (time/frequency) resource, and may differentiate the RACH preambles of the beams in the code domain (e.g., using a Zadoff-Chu sequence, a pseudo-noise sequence, an orthogonal cover code, and/or the like). In this case, the BS may signal, per beam or per group of beams, a subset of code parameters (e.g., Zadoff-Chu shifts and/or roots, pseudo-noise shifts and/or roots, orthogonal cover code indexes, and/or the like) to be used for each beam or group of beams. Thus, different beams or groups of beams may be differentiated when RACH preambles of the beams or groups of beams are transmitted in overlapped time/frequency resources.

As indicated above, FIG. 3 is provided as an example. Other examples may differ from what is described with respect to FIG. 3.

Figure 4:
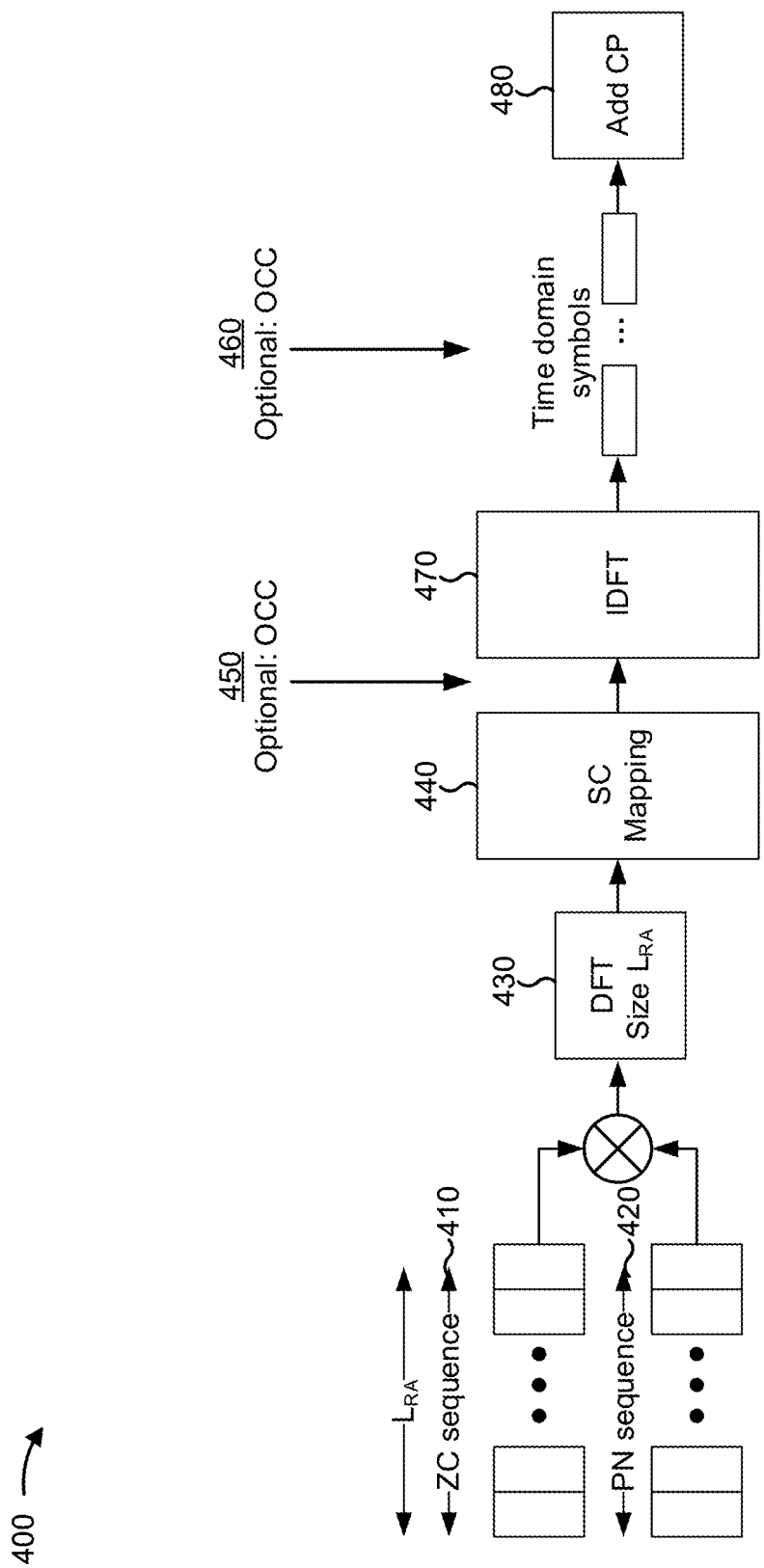
FIG. 4 is a diagram illustrating an example of encoding and processing an NTN RACH preamble, in accordance with various aspects of the present disclosure.

FIG. 4 is a diagram illustrating an example 400 of encoding and processing an NTN RACH preamble, in accordance with various aspects of the present disclosure. The operations described in connection with example 400 may be performed by a UE (e.g., UE 120, UE 320, and/or the like).

As shown in FIG. 4, and by reference number 410, the UE may apply a Zadoff-Chu (ZC) sequence to a set of symbols of a length $L_{RA}$. This may be referred to herein as a first coding procedure. The set of symbols may form a random access (RA) preamble. In some aspects, the UE may select a ZC signature (e.g., a ZC shift and/or a ZC root) to be used to encode the preamble. In some aspects, when encoding the NTN RACH preamble, the UE may use an increased number of permitted ZC signatures relative to a terrestrial RACH procedure. For example, the UE may select a ZC signature for the first coding procedure from a set of more than 64 possible signatures (e.g., 96 possible signatures, 128 possible signatures, or a different number of possible signatures), wherein the terrestrial RACH procedure may use a set of 64 possible signatures. This may increase the number of NTN RACH preambles that can be code division multiplexed with each other.

As shown by reference number 420, in some aspects, the UE may perform a second coding procedure, such as a second coding procedure that does not involve a ZC code. Here, the UE performs a pseudo-noise (PN) coding procedure, although techniques and apparatuses described herein are not limited to those involving the PN coding procedure as the second coding procedure. In some aspects, the UE may select a signature (e.g., a shift, a polynomial, a root, and/or the like) for the second coding procedure. For example, the UE may select the signature randomly, pseudo-randomly, using a pattern, and/or the like, which may conserve resources of the BS that would otherwise be used to indicate the pattern. In some aspects, the UE may receive information indicating a signature that is to be used. For example, the BS may provide the information indicating the signature that is to be used, which may improve network resource utilization and conserve processor resources of the UE that would otherwise be used to select the signature.

As further shown, the UE may combine the coded outputs of the first coding procedure and the second coding procedure. As shown by reference number 430, the UE may perform discrete Fourier transformation (DFT) spreading on the combined output using a size of $L_{RA}$. As shown by reference number 440, the UE may perform subcarrier (SC) mapping so that the transformed output is mapped to a set of frequency resources (e.g., subcarriers, symbols, and/or the like).

As shown by reference number 450, in some aspects, the UE may apply orthogonal cover coding (OCC) on the set of frequency domain symbols. This may be referred to herein as a second coding procedure. In some aspects, the UE may perform a second coding procedure based at least in part on a PN sequence and based at least in part on an OCC. For example, the UE may apply the PN sequence before DFT spreading occurs, and may apply the OCC after DFT spreading occurs. As shown by reference number 460, in some aspects, the UE may apply the OCC after an inverse DFT (IDFT) operation 470 is performed (e.g., after the symbols are converted to the time domain) and before a cyclic prefix (CP) is added at reference number 480. For example, the UE may apply the OCC before the IDFT operation 470 is performed or after the IDFT operation 470 is performed. In some aspects, the UE may select a signature for the OCC. For example, the UE may select the signature randomly, pseudo-randomly, using a pattern, and/or the like, which may conserve resources of the BS that would otherwise be used to indicate the pattern. In some aspects, the UE may receive information indicating a signature that is to be used. For example, the BS may provide the information indicating the signature that is to be used, which may improve network resource utilization and conserve processor resources of the UE that would otherwise be used to select the signature.

In some aspects, the BS may provide an indication to enable or disable one or more of the above operations (e.g., indicated by reference numbers 410, 420, 450, and/or 460). For example, the BS may provide an indication of whether an increased number of ZC signatures is to be used, an indication of whether to perform a second coding procedure based at least in part on a PN sequence, an indication of whether to perform a second coding procedure based at least in part on an OCC (and/or whether the second coding procedure is to be performed before or after the IDFT operation), and/or the like. Thus, the BS may balance the complexity of encoding the NTN RACH preamble and the needs of the network (e.g., based at least in part on how many UEs are expected to contemporaneously perform a RACH operation, based at least in part on available network resources, and/or the like).

As indicated above, FIG. 4 is provided as an example. Other examples may differ from what is described with respect to FIG. 4.

Figure 5:
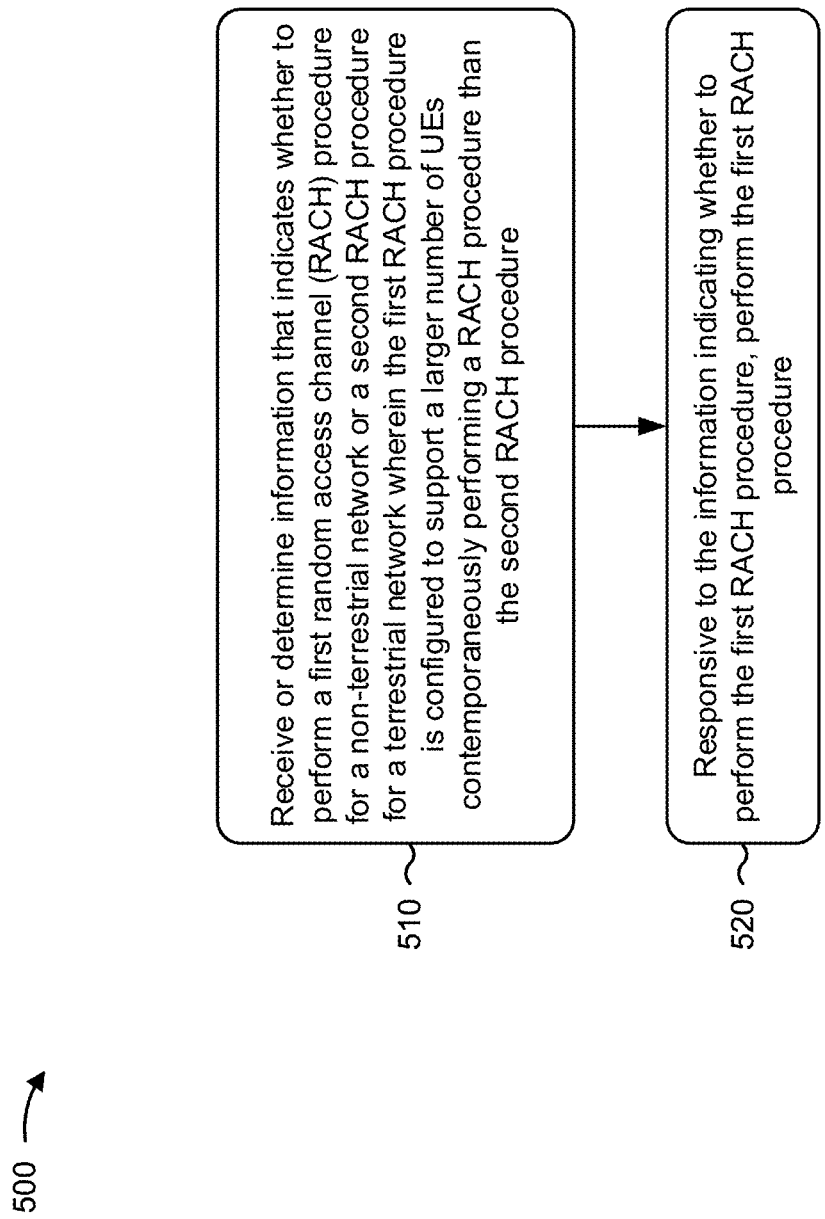
FIG. 5 is a diagram illustrating an example process performed, for example, by a user equipment, in accordance with various aspects of the present disclosure.

FIG. 5 is a diagram illustrating an example process 500 performed, for example, by a user equipment, in accordance with various aspects of the present disclosure. Example process 500 is an example where a user equipment (e.g., UE 120, UE 320, and/or the like) performs operations associated with random access for a non-terrestrial network.

As shown in FIG. 5, in some aspects, process 500 may include receiving or determining information that indicates whether to perform a first random access channel (RACH) procedure for a non-terrestrial network or a second RACH procedure for a terrestrial network wherein the first RACH procedure is configured to support a larger number of UEs contemporaneously performing a RACH procedure than the second RACH procedure (block 510). For example, the user equipment (e.g., using antenna 252, DEMOD 254, MIMO detector 256, receive processor 258, controller/processor 280, and/or the like) may receive or determine information that indicates whether to perform a first RACH procedure for a non-terrestrial network or a second RACH procedure for a terrestrial network, as described, for example, with reference to FIGS. 3 and 4. In some aspects, the first RACH procedure is configured to support a larger number of UEs contemporaneously performing a RACH procedure than the second RACH procedure. In some aspects, the information is based at least in part on whether the UE is associated with the non-terrestrial network or the terrestrial network. Determining information that indicates to perform the first RACH procedure can include determining the information based at least in part on an implicit indication.

As further shown in FIG. 5, in some aspects, process 500 may include, responsive to the information indicating whether to perform the first RACH procedure, performing the first RACH procedure (block 520). For example, the user equipment (e.g., using controller/processor 280, transmit processor 264, TX MIMO processor 266, MOD 254, antenna 252, and/or the like) may perform the first RACH procedure in accordance with the information, as described, for example, with reference to FIGS. 3 and 4.

Process 500 may include additional aspects, such as any single implementation or any combination of aspects described below and/or in connection with one or more other processes described elsewhere herein.

In a first aspect, the first RACH procedure is performed based at least in part on a Zadoff-Chu signature that is selected from a larger number of permitted Zadoff-Chu signatures than the second RACH procedure.

In a second aspect, alone or in combination with the first aspect, the first RACH procedure is performed based at least in part on a Zadoff-Chu signature that is selected from more than 64 permitted Zadoff-Chu signatures.

In a third aspect, alone or in combination with one or more of the first and second aspects, performing the first RACH procedure comprises performing a first coding procedure comprising a Zadoff-Chu coding procedure and performing a second coding procedure.

In a fourth aspect, alone or in combination with one or more of the first through third aspects, the second coding procedure is based at least in part on a pseudo-noise sequence.

In a fifth aspect, alone or in combination with one or more of the first through fourth aspects, the second coding procedure is based at least in part on a signature.

In a sixth aspect, alone or in combination with one or more of the first through fifth aspects, the signature is randomly or pseudo-randomly selected by the UE.

In a seventh aspect, alone or in combination with one or more of the first through sixth aspects, the second coding procedure is based at least in part on a signature that is signaled to the UE.

In an eighth aspect, alone or in combination with one or more of the first through seventh aspects, the second coding procedure comprises a cover coding procedure.

In a ninth aspect, alone or in combination with one or more of the first through eighth aspects, a length of a cover code of the cover coding procedure is based at least in part on a number of repetitions of the RACH procedure.

In a tenth aspect, alone or in combination with one or more of the first through ninth aspects, the cover coding procedure is based at least in part on a cover code that is randomly or pseudo-randomly selected by the UE.

In an eleventh aspect, alone or in combination with one or more of the first through tenth aspects, the cover coding procedure is based at least in part on a cover code that is signaled to the UE.

In a twelfth aspect, alone or in combination with one or more of the first through eleventh aspects, the second coding procedure is performed in a frequency domain.

In a thirteenth aspect, alone or in combination with one or more of the first through twelfth aspects, the second coding procedure is performed in a time domain.

In a fourteenth aspect, alone or in combination with one or more of the first through thirteenth aspects, the UE may receive an indication to perform the second coding procedure, wherein performing the first RACH procedure comprises performing the second coding procedure based at least in part on the indication to perform the second coding procedure.

In a fifteenth aspect, alone or in combination with one or more of the first through fourteenth aspects, when respective RACH resources of multiple beams are configured in a same bandwidth part, performing the first RACH procedure comprises applying a particular code to a RACH message based at least in part on a beam of the multiple beams.

In a sixteenth aspect, alone or in combination with one or more of the first through fifteenth aspects, the particular code is selected from a subset of codes of a set of codes, wherein the set of codes is associated with the multiple beams.

In a seventeenth aspect, alone or in combination with one or more of the first through sixteenth aspects, the respective RACH resources are configured in a same time resource or a same frequency resource.

In an eighteenth aspect, alone or in combination with one or more of the first through seventeenth aspects, the multiple beams are differentiated in a code domain.

In a nineteenth aspect, alone or in combination with one or more of the first through eighteenth aspects, the UE may determine whether to perform the first RACH procedure for the non-terrestrial network or the second RACH procedure for the terrestrial network based at least in part on the information.

In a twentieth aspect, alone or in combination with one or more of the first through nineteenth aspects, the information that indicates whether to perform the first RACH procedure includes information for performing the first RACH procedure.

In a twenty-first aspect, alone or in combination with any one or more of the first through twentieth aspects, the information is based at least in part on whether the UE is associated with the terrestrial network or the non-terrestrial network.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a network device (e.g., a base station in a non-terrestrial network), in accordance with various aspects of the present disclosure. Example process 600 is an example where a network device (e.g., BS 110, network controller 130, BS 140, BS 310, and/or the like) performs operations associated with random access for a non-terrestrial network.

As shown in FIG. 6, in some aspects, process 600 may include transmitting information that indicates whether a UE is to perform a first RACH procedure for a non-terrestrial network or a second RACH procedure for a terrestrial network (block 610). For example, the network device (e.g., using controller/processor 240, transmit processor 220, TX MIMO processor 230, MOD 232, antenna 234, and/or the like) may transmit information that indicates whether a UE is to perform a first RACH procedure for a non-terrestrial network or a second RACH procedure for a terrestrial network, as described, for example, with reference to FIGS. 3 and 4. In some aspects, the first RACH procedure is configured to support a larger number of UEs contemporaneously performing a RACH procedure than the second RACH procedure. In some aspects, the information is based at least in part on whether the UE is associated with the non-terrestrial network or the terrestrial network.

As further shown in FIG. 6, in some aspects, process 600 may include, when the information indicates to perform the first RACH procedure, performing the first RACH procedure in accordance with the information (block 620). For example, the network device (e.g., using antenna 234, DEMOD 232, MIMO detector 236, receive processor 238, controller/processor 240, and/or the like) may perform the first RACH procedure in accordance with the information, as described, for example, with reference to FIGS. 3 and 4.

Process 600 may include additional aspects, such as any single implementation or any combination of aspects described below and/or in connection with one or more other processes described elsewhere herein.

In a first aspect, the first RACH procedure is performed based at least in part on a Zadoff-Chu signature that is selected from a larger number of permitted Zadoff-Chu signatures than the second RACH procedure.

In a second aspect, alone or in combination with the first aspect, the first RACH procedure is performed based at least in part on a Zadoff-Chu signature that is selected from more than 64 permitted Zadoff-Chu signatures.

In a third aspect, alone or in combination with one or more of the first and second aspects, the first RACH procedure includes a first coding procedure that comprises a Zadoff-Chu coding procedure and a second coding procedure.

In a fourth aspect, alone or in combination with one or more of the first through third aspects, the second coding procedure is based at least in part on a pseudo-noise sequence.

In a fifth aspect, alone or in combination with one or more of the first through fourth aspects, the second coding procedure is based at least in part on a signature. In some aspects, the signature is randomly or pseudo-randomly selected by the UE.

In a sixth aspect, alone or in combination with one or more of the first through fifth aspects, the network device may signal a signature to be used for the second coding procedure to the UE.

In a seventh aspect, alone or in combination with one or more of the first through sixth aspects, the second coding procedure comprises a cover coding procedure.

In an eighth aspect, alone or in combination with one or more of the first through seventh aspects, a length of a cover code of the cover coding procedure is based at least in part on a number of repetitions of the RACH procedure.

In a ninth aspect, alone or in combination with one or more of the first through eighth aspects, the cover coding procedure is based at least in part on a cover code that is randomly or pseudo-randomly selected by the UE.

In a tenth aspect, alone or in combination with one or more of the first through ninth aspects, the base station may signal information identifying a cover code to be used for the cover coding procedure to the UE.

In an eleventh aspect, alone or in combination with one or more of the first through tenth aspects, the second coding procedure is performed in a frequency domain.

In a twelfth aspect, alone or in combination with one or more of the first through eleventh aspects, the second coding procedure is performed in a time domain.

In a thirteenth aspect, alone or in combination with one or more of the first through twelfth aspects, the network device may provide an indication that the UE is to perform the second coding procedure as part of the first RACH procedure.

In a fourteenth aspect, alone or in combination with one or more of the first through thirteenth aspects, when respective RACH resources of multiple beams are configured in a same bandwidth part, performing the first RACH procedure comprises applying a particular code to a RACH message based at least in part on a beam, of the multiple beams, for which the first RACH procedure is being performed.

In a fifteenth aspect, alone or in combination with one or more of the first through fourteenth aspects, the particular code is based at least in part on a beam, of the multiple beams, for which the first RACH procedure is being performed.

In a sixteenth aspect, alone or in combination with one or more of the first through fifteenth aspects, the particular code is selected from a subset of codes of a set of codes associated with the multiple beams. In a seventeenth aspect, alone or in combination with any one or more of the first through sixteenth aspects, the multiple beams are associated with respective subsets of codes of the sets of codes.

In an eighteenth aspect, alone or in combination with one or more of the first through seventeenth aspects, the respective RACH resources are configured in a same time resource or a same frequency resource.

In a nineteenth aspect, alone or in combination with one or more of the first through eighteenth aspects, the multiple beams are differentiated in a code domain.

In a twentieth aspect, alone or in combination with one or more of the first through nineteenth aspects, the network device may determine whether to perform the first RACH procedure for the non-terrestrial network or the second RACH procedure for the terrestrial network based at least in part on the information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving or determining information that indicates whether to perform a first random access channel (RACH) procedure for a non-terrestrial network or a second RACH procedure for a terrestrial network,
wherein the first RACH procedure is configured to support a larger number of UEs contemporaneously performing a RACH procedure than the second RACH procedure; and
responsive to the information indicating that the UE is to perform the first RACH procedure, performing the first RACH procedure.

2. The method of claim 1, wherein the first RACH procedure is performed based at least in part on a Zadoff-Chu signature that is selected from a larger number of permitted Zadoff-Chu signatures than the second RACH procedure.

3. The method of claim 1, wherein the first RACH procedure is performed based at least in part on a Zadoff-Chu signature that is selected from more than 64 permitted Zadoff-Chu signatures.

4. The method of claim 1, wherein performing the first RACH procedure comprises:
performing a first coding procedure comprising a Zadoff-Chu coding procedure and performing a second coding procedure.

5. The method of claim 4, wherein the second coding procedure is based at least in part on a pseudo-noise sequence.

6. The method of claim 4, wherein the second coding procedure is based at least in part on a signature, wherein the signature is randomly or pseudo-randomly selected by the UE.

7. The method of claim 4, wherein the second coding procedure is based at least in part on a signature that is signaled to the UE.

8. The method of claim 4, wherein the second coding procedure comprises a cover coding procedure.

9. The method of claim 8, wherein a length of a cover code of the cover coding procedure is based at least in part on a number of repetitions of the RACH procedure.

10. The method of claim 8, wherein the cover coding procedure is based at least in part on a cover code that is randomly or pseudo-randomly selected by the UE.

11. The method of claim 8, wherein the cover coding procedure is based at least in part on a cover code that is signaled to the UE.

12. The method of claim 4, further comprising:
receiving an indication to perform the second coding procedure,
wherein performing the first RACH procedure comprises performing the second coding procedure based at least in part on the indication to perform the second coding procedure.

13. The method of claim 1, wherein, when respective RACH resources of multiple beams are configured in a same bandwidth part, performing the first RACH procedure comprises:
applying a particular code to a RACH message based at least in part on a beam of the multiple beams.

14. The method of claim 13, wherein the particular code is selected from a subset of codes of a set of codes, wherein the set of codes is associated with the multiple beams.

15. The method of claim 13, wherein the respective RACH resources are configured in a same time resource or a same frequency resource, and wherein the multiple beams are differentiated in a code domain.

16. The method of claim 1, wherein the information is based at least in part on whether the UE is associated with the terrestrial network or the non-terrestrial network.

17. A method of wireless communication performed by a network device, comprising:
transmitting information that indicates whether a user equipment (UE) is to perform a first random access channel (RACH) procedure for a non-terrestrial network or a second RACH procedure for a terrestrial network, wherein the first RACH procedure is configured to support a larger number of UEs contemporaneously performing a RACH procedure than the second RACH procedure, and the information is based at least in part on whether the UE is associated with the non-terrestrial network or the terrestrial network; and
when the information indicates to perform the first RACH procedure, performing the first RACH procedure in accordance with the information.

18. The method of claim 17, wherein the information indicating that the UE is to perform the first RACH procedure for the non-terrestrial network is transmitted by a base station, associated with or comprising the network device, of the non-terrestrial network.

19. The method of claim 17, wherein the first RACH procedure is performed based at least in part on a Zadoff-Chu signature that is selected from a larger number of permitted Zadoff-Chu signatures than the second RACH procedure.

20. The method of claim 17, wherein the first RACH procedure includes a first coding procedure that comprises a Zadoff-Chu coding procedure and a second coding procedure.

21. The method of claim 20, wherein the second coding procedure is based at least in part on a pseudo-noise sequence.

22. The method of claim 20, wherein the second coding procedure is based at least in part on a signature, wherein the signature is randomly or pseudo-randomly selected by the UE.

23. The method of claim 20, further comprising:
signaling a shift or a polynomial to be used for the second coding procedure to the UE.

24. The method of claim 20, wherein the second coding procedure comprises a cover coding procedure, wherein a length of a cover code of the cover coding procedure is based at least in part on a number of repetitions of the RACH procedure.

25. The method of claim 24, wherein the cover coding procedure is based at least in part on a cover code that is randomly or pseudo-randomly selected by the UE.

26. The method of claim 20, further comprising:
providing an indication that the UE is to perform the second coding procedure as part of the first RACH procedure.

27. The method of claim 15, wherein, when respective RACH resources of multiple beams are configured in a same bandwidth part, performing the first RACH procedure comprises:
receiving a RACH message based at least in part on a particular code, wherein the particular code is based at least in part on a beam, of the multiple beams, for which the first RACH procedure is being performed.

28. The method of claim 27, wherein the particular code is selected from a subset of codes of a set of codes associated with the multiple beams, wherein the multiple beams are associated with respective subsets of codes of the sets of codes.

29. A user equipment (UE) for wireless communication, comprising:
a memory; and one or more processors operatively coupled to the memory, the one or more processors configured to:
receive information that indicates whether to perform a first random access channel (RACH) procedure for a non-terrestrial network or a second RACH procedure for a terrestrial network,
wherein the first RACH procedure is configured to support a larger number of UEs contemporaneously performing a RACH procedure than the second RACH procedure; and
responsive to the information indicating whether to perform the first RACH procedure, perform the first RACH procedure.

30. A network device for wireless communication, comprising:
a memory; and
one or more processors operatively coupled to the memory, the one or more processors configured to:
transmit information that indicates whether a user equipment (UE) is to perform a first random access channel (RACH) procedure for a non-terrestrial network or a second RACH procedure for a terrestrial network, wherein
the first RACH procedure is configured to support a larger number of UEs contemporaneously performing a RACH procedure than the second RACH procedure, and
the information is based at least in part on whether the UE is associated with the non-terrestrial network or the terrestrial network; and
when the information indicates to perform the first RACH procedure, perform the first RACH procedure in accordance with the information.

* * * * *